United States Patent Office 2,921,838
Patented Jan. 19, 1960

2,921,838
PROCESS OF PREPARING CHROMIC OXIDE

Francis L. Melvill, Berea, Johannesburg, Transvaal, Union of South Africa, assignor of one-half to Leonard J. Buck, Incorporated, Jersey City, N.J., a corporation of New Jersey No Drawing. Application April 23, 1957
Serial No. 654,471

11 Claims. (Cl. 23—145)

The present invention relates to a process for preparing chromic oxide and, more particularly, for preparing this material in a substantially pure form under economically practicable conditions, starting with an alkali chromate and/or bichromate, such, for example, as sodium or potassium chromate or bichromate.

It has been known for some time to mix chrome ores with an alkali carbonate or bicarbonate and then to subject such materials to an oxidizing roast, so as to convert the chromium content thereof to the form of the corresponding alkali chromate and/or bichromate. These alkali chromium salts, which are water-soluble, may then be separated from the insoluble portions of the ore by a leaching operation, followed by any suitable solid-liquid separation operation, including decantation and/or filtration. In this way, there is prepared from the leach solution, the alkali chromate and/or bichromate, substantially unmixed with any water-insoluble materials, including the gangue portions of the ore. This chromate and/or bichromate material, which may be prepared in this way, is a preferred starting material for the process of the present invention. On the other hand, it is wholly immaterial from the point of view of the present invention, whether the alkali chromate and/or bichromate used as the starting material thereof is prepared in this or some other manner, as the present invention starts at this point.

While it is known that chromates and/or bichromates are usually considered as strong oxidizing agents and further, that a product of the oxidation effected thereby may, in many instances, be chromic oxide ($Cr_2O_3$), yet the preparation of chromic oxide in a substantially pure form, using conventional reducing agents, has not heretofore been known, at least when this operation is conducted in an economically practicable manner, so as to yield the chromic oxide of the desired purity. It is to this particular process that the present invention pertains.

It is found, in accordance with the present invention, that in order to have the chromic oxide relatively pure, it is desirable that there be present, during the reduction operation, an aluminum compound of a type which is capable of reacting with the alkali metal present in the starting material in chemical combination with the chromium. The provision of a reaction wherein such an aluminum compound is present is a principal feature of the present invention. It is found that this aluminum compound should be present in a form, which is insoluble in water, but soluble in caustic alkali in an aqueous solution thereof, either by solution therein or by chemical reaction therewith. It is further found that, for best results, the aluminum compound should be present in a total amount at least stoichiometrically equivalent to all the alkali metal present in the starting material so as to form therewith a compound such as sodium aluminate ($NaAlO_2$). It will be understood that throughout the present invention, where alkali compounds or caustic alkali are referred to, sodium is ordinarily intended; although sodium and potassium are full equivalents each of the other from the point of view of the present invention in all its phases, so that either or a mixture of both could be used in any part of this invention.

The present invention is one in which the starting material, consisting of alkali chromate and/or bichromate, is reacted with the aluminum compound as aforesaid in the presence of a suitable reducing agent, the requirements for which will be discussed hereinafter, so as to reduce the chromium from a valence of 6 to a valence of 3. This reaction must be initiated by heating the starting materials to a temperature in the range of about 1000° F. to 1200° F., whereupon the reaction is exothermic and self-sustaining. In some instances it may be desired to control and, more particularly, to slow down the rate of this reaction. This may be accomplished, for example, by mixing a gaseous reducing agent with a sufficient proportion of an inert gaseous material, as well as by controlling temperatures, etc., as hereinafter discussed.

The principal reduction reaction having been completed, the solid products thereof, which include chromic oxide (solid) as wall as the alkali aluminate, may then be separated by a leaching operation under conditions such as to retain all the aluminum in a water-soluble compound form, which leaves the chromic oxide as the only insoluble material present. This chromic oxide may then be separated from the liquid, and washed to provide a principal product of the process.

The process, however, would be in many instances very uneconomic were it not possible to recover and reuse many, if not all, of the other materials used therein, namely, the aluminum compounds in question and also the sodium or other alkali present. The aluminum compound may be recovered from the leaching solution by treating this solution with a mildly acid material, such as sodium bicarbonate or carbon dioxide, which precipitates the aluminum as the hydrate or as the phosphate (in the event that the original aluminum compound used was aluminum phosphate). The remaining solution contains the alkali in carbonate and/or bicarbonate form, from which it may be recovered for use in treating more ore as aforesaid or for any other desired use, this by conventional concentration and/or evaporation methods.

Turning now to the details of the present process, it may be of general interest to give a brief synopsis of the manner of treating chrome ore, so as to produce the starting material for the present process, it being understood, however, that this ore treating process herein described is per se no necessary part of the present process.

In this process chrome ore is intimately mixed with sufficient inert material to prevent caking of the charge and usually with substantially the stoichiometric amount of sodium carbonate (and/or bicarbonate). This mixture may then be treated in a gas-to-solid reaction apparatus, such as a rotary kiln, in which it may travel in effect countercurrent to flue gases having a relatively high content of excess air or oxygen. In the kiln, the solid materials are heated to approximately 2000° F. under oxidizing conditions, this process resulting in the production of a calcine, in which the greater part of the sodium now exists in the form of sodium chromate ($Na_2CrO_4$). The calcine so produced is then leached with water, and the resulting solution of chromate and/or bichromate is separated from the insoluble materials by filtration and/or other conventional means. This solution may then be suitably treated to yield the desired alkali chromate and/ or bichromate. Alternatively, when the solution is substantially all chromate, it may be treated with a mineral acid or with carbon dioxide under pressure in order to convert the chromate to bichromate, which may then be recovered from the solution by crystallization or other conventional means.

While in most instances it may be preferred to start with the starting material as one or more anhydrous salts, i.e. chromate, bichromate or a mixture of the two, it is contemplated that under certain conditions as hereinafter set out, hydrated salts or mixtures thereof with the corresponding anhydrous compounds may desirably be used. This is particularly true when the principal reduction reaction is carried on a fluidized bed.

The next element to be considered in detail is the aluminum compound used. In general, it may be said that any compound of aluminum, which is insoluble in water but is soluble in caustic alkali, is satisfactory. Particularly, however, it is contemplated that a hydrate of aluminum which may be anywhere between $Al_2O_3$ and $Al(OH)_3$ is satisfactory, the exact composition not being known in most instances as this material (as hereinafter set forth) is reformed and reused in the process, so that there is very little waste thereof. Another compound of aluminum which has been found satisfactory is aluminum phosphate ($AlPO_4$). This compound also may be reformed as hereinafter set out.

It is usual in the present process to provide a sufficient amount of the aluminum compound as aforesaid, at least stoichiometrically equivalent to all the alkali metal (sodium or potassium) which is introduced into the process in chemical combination with the chromium in the starting material, so as to form therefrom alkali aluminate, as $NaAlO_2$. This stoichiometric equivalency or excess is not, however, absolutely essential, for in the event that an insufficient amount of aluminum compound is present, there will be practically very little reduction of the excess alkali chromate or bichromate. These materials (alkali chromate and/or bichromate) are both water-soluble, and so will go through the process hereinafter described with the water-soluble materials thereof and, in the preferred operation of the process, will be returned to the ore treating phase above described along with the recoverable alkali metal salts as sodium carbonate and/or bicarbonate. Thus, unreduced chromium, due to an insufficient aluminum concentration for the principal reaction, will not be lost, but will normally be returned to the process.

The starting material and the aluminum compound used will normally be in fairly fine particle form and will be intimately mixed with the other; although the particle size is not narrowly critical as to the operability of the present process, and the intimate mixing, while desirable, is also not narrowly critical.

The next factor to be considered is the nature and character of the reducing agent. In this case, substantially any reducing agent may be used with, however, certain considerations hereinafter set out bearing upon the selection of the agent to be used. The preferred reducing agent is usually a gaseous material such as hydrogen or carbon monoxide or a material which may be converted to a gaseous form by heating, such as some of the lower hydrocarbons, etc. By using such a gaseous material, it is possible to mix this gaseous reducing agent with a suitable proportion of an inert gaseous material (one or more inert gases) and thereby control the speed of the reaction and also the temperature thereof. On the other hand, it is possible to use solid reducing agents as, for example, carbon, either in pure form or in the form of coal or the like. It is, of course, necessary that there be a sufficient amount of reducing agent to reduce the 6-valent chromium to 3-valent chromium. In the absence of a sufficient amount of this reducing agent, however, the unreduced 6-valent chromium, which is in the form of an alkali metal salt, as the chromate and/or bichromate and is water-soluble, will merely go through the process with the water-soluble salts and may be returned to the process in the ore treating stage as aforesaid. However, normally it is preferred to use an excess of reducing agent over the amount stoichiometrically required.

In the event that carbon is used, the excess carbon which is itself insoluble, will come out of the process in admixture with the chromic oxide and will affect the color thereof. This may be tolerated for some uses for which chromic oxide may be desired, but would not be tolerated for other such uses. Furthermore, if an impure form of carbon is used, for example coal, the ash content thereof would also come out of the process in admixture with the chromic oxide as a diluent or solid contaminant thereof. Here again, the selection of the reducing agent must be governed by the requirements for purity of the chromic oxide being produced.

Similar considerations affect the selection of reducing agents which are hydrocarbons, particularly as to the advisability of using either relatively high molecular weight and/or some unsaturated types which may break down during the reduction reaction, so as to deposit carbon in excess of that which is used up in the reduction reaction itself. Here again the same considerations apply as discussed with respect to the use of carbon alone.

Another type of reducing agent which has been tried and found both satisfactory and operative, and which has certain special advantages, is a lower aliphatic alcohol. The reduction operation in this case results in the oxidation of this alcohol to the corresponding aldehyde and/or ketone. In such instances, where the oxidation products of the reducing agent are themselves desired as products of the process, the choice of reducing agent may require the use of such a lower aliphatic alcohol.

The principal reaction in this case may, for example, be expressed by one of the following equations, which are given by way of example and not by way of limitation:

$$2Na_2CrO_4 + 2Al_2O_3 + 3H_2 \rightarrow Cr_2O_3 + 3H_2O + 4NaAlO_2 \quad (1)$$

$$2Na_2Cr_2O_7 + AlPO_4 + 6H_2 \rightarrow 2Cr_2O_3 + NaAlO_2 + Na_3PO_4 + 6H_2O \quad (2)$$

$$2Na_2CrO_4 + 4Al(OH)_3 + 3CO \rightarrow Cr_2O_3 + 4NaAlO_2 + 6H_2O + 3CO_2 \quad (3)$$

These equations show the reactions, both with sodium chromate and sodium bichromate, also with aluminum in the form of alumina, as well as in the form of completely hydrated alumina and also in the form of the phosphate. They further illustrate the use of hydrogen and carbon monoxide as reducing agents. Other equations could similarly be worked out showing the other alternatives hereinabove mentioned.

The principal reduction reaction, from a practical point of view, may take place in any suitable type of apparatus, including, for example (but not limited to), fluidized bed apparatus. This reaction is initiated by heating the reactants up to a temperature in the range of about 1000° F. to about 1200° F., after which the reaction is completely self-sustaining to substantially 100% completion and is exothermic in character. In fact, the reaction, once initiated, tends to proceed so rapidly, that it is normally completed in a relatively short space of time, for example, 10 or 15 seconds.

On the other hand, the tendency for the reaction to proceed very rapidly may, in some instances, be undesirable as it may involve heating the reacting materials, and perforce the reaction products up to some undesired high temperatures. In such an event, it may be desired to slow down and control the rate of the reaction and particularly to control the temperature attained by the materials during the reaction. For this purpose, either the solid materials or the gaseous reducing agent or both may be mixed with some suitable diluent material.

In the case of the solid materials, such diluent material could, for example, be sodium carbonate or bicarbonate; whereas in the case of a gaseous reducing agent, the diluent material could be an inert gaseous material, such as nitrogen or steam, or some mixture of two or more inert gases. The presence of inert materials during the reaction is purely to control the velocity thereof and the temperatures attained during such reaction, and does not affect the reaction itself from a chemical point of view. One reason for keeping reaction temperatures in a lower range is to prevent fusion of the reaction products, converting these products to a relatively hard condition such as a solid solution and making the next step, namely the leaching operation, more difficult. If the reaction products are relatively loose and friable in character, the leaching operation may proceed thereon with a minimum of difficulty; whereas if they are substantially fused together, substantial comminution may be necessary prior to effective leaching.

The next operation is the leaching of the reaction products in an aqueous solution, in this case, in a solution of a caustic alkali in sufficient concentration so as to stabilize the sodium aluminate as a water-soluble material and so that the only materials normally remaining undissolved will be the chromic oxide, which is a desired product of the process (assuming there is no free carbon or ash therewith, which also would be undissolved). This chromic oxide may then be separated from the water-soluble components in solution by any usual filtration or decantation methods, following which the chromic oxide is normally washed with water to yield the desired product. The chromic oxide produced is quite pure when using a gaseous reducing agent such as hydrogen or carbon monoxide and is a rich green color.

The above ends the essential features of the process from a chemical point of view, in the absence of recovery of by-products for reuse, which is also necessary from an economic point of view in a commercial embodiment of the process.

Considering now this recovery of by-products for reuse, the first material to be recovered is the aluminum compound. This compound may be recovered from the leach solution, after separation of the chromic oxide therefrom, by acidifying the solution with a weak acid material such, for example, as sodium bicarbonate and/or carbon dioxide. Treatment of the leach solution is effective under either circumstances mentioned to precipitate the aluminum compound, for example, as shown in any one of the following equations:

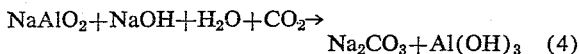

$$NaAlO_2 + NaOH + H_2O + CO_2 \rightarrow Na_2CO_3 + Al(OH)_3 \quad (4)$$

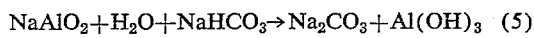

$$NaAlO_2 + H_2O + NaHCO_3 \rightarrow Na_2CO_3 + Al(OH)_3 \quad (5)$$

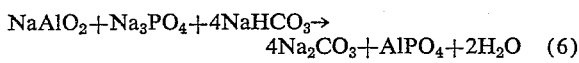

$$NaAlO_2 + Na_3PO_4 + 4NaHCO_3 \rightarrow 4Na_2CO_3 + AlPO_4 + 2H_2O \quad (6)$$

This precipitated aluminum compound may then be separated from the supernatant liquid and reused in the principal reaction of the present process by admixing it with more of the starting material, i.e. the alkali chromate or bichromate. The supernatant liquid may itself be concentrated and/or evaporated so as to recover the sodium carbonate and/or bicarbonate therefrom which may be returned to the ore treating step of the process. It will be understood that in the event that any of the original alkali chromate or bichromate is not reduced in the principal reaction of this process, this material will flow through the process and be recovered in admixture with the sodium carbonate or bicarbonate to be returned to the ore treating step of the process as aforesaid.

In these ways it is possible, with a minimum loss of the reactants incident to handling the various materials in the process, to reduce the original chromate or bichromate to chromic oxide and to produce that material in a very pure form and at a minimum cost.

The process may be further illustrated by the following examples:

*Example I*

In this example, the starting material was prepared in the proportion of 26.2 grams of anhydrous sodium bichromate and 18 grams of a hydrated alumina precipitated from a sodium aluminate solution by carbon dioxide, the hydrated alumina being known to contain 12 grams of aluminum, expressed as $Al_2O_3$, which represented an excess of aluminum over the stoichiometric amount required as aforesaid of about 18%. These materials were in fine powdered form and were thoroughly mixed and ground, using a mortar and pestle. The mixture thus made was subjected to a plurality of tests as set forth in this example:

(a) In this test 3 grams of the mixture prepared as aforesaid was placed in a ceramic boat which was put in an Alundum combustion tube, through which hydrogen was passed at a steady rate. The material in the tube was heated up to about 1100° F. at which temperature the mass in the boat began to glow brightly and for a short time was apparently substantially above the temperature of the tube itself. After the boat was removed from the tube, it was found that the contents thereof had fused almost completely, so that it was difficult to remove them. Sufficient of the fused material was analyzed, however, to show that it consisted essentially of chromic oxide and sodium aluminate. Due to the nature of the reaction products, no quantitative figures were obtained in this test.

(b) In this test 3 grams of the same starting material mixture was placed in a similar boat and the boat in turn placed in a hot tube, but at a point where it was not directly heated and was kept relatively cool. In this position it was swept by a stream of hydrogen which had passed through the hot zone in the tube so as to have become heated, the hot zone being kept at about 1500° F. After about five minutes, the mass in the boat glowed and maintained this glow for about 15 to 30 seconds and then remained at a dull red heat, indicative of a temperature of about 1100° F. On removal of the boat from the tube, the contents (reaction products), showed no evidence of fusion, but was a friable, dark colored product with some white specks present. The contents of the boat were tipped into a beaker containing more than the necessary amount of 10% caustic soda solution. The reaction products were boiled for about ½ hour in this solution, which resulted in the solution of all the aluminum compounds, leaving solely the chromic oxide as undissolved material. This undissolved chromic oxide was filtered out, washed first with a 10% caustic soda solution and then with water. It was dried and weighed, the weight being 0.95 gram and indicating about 92% yield of chromium, calculated from the bichromate used in the starting material.

(c) A test similar to test (b) was carried out using ordinary city gas, instead of pure hydrogen, and with similar results to those hereinabove set forth except that in this case some evidence of soot appeared in the ceramic boat and in the chromic oxide recovered. The amount of chromic oxide recovered in this test was 0.9 gram, equivalent to an 87% yield.

(d) In this test, carbon monoxide was used as the reducing agent, this material being diluted with about an equal amount of carbon dioxide, the latter serving as a diluent neutral gas to control the rate of the reaction. The results were qualitatively similar to those results described above in section (b) of this example. In this case the chromic oxide recovered weighed 0.97 gram, which was equivalent to 94% yield.

*Example II*

In this example a starting material mixture was made up in the proportion of 32.4 grams of anhydrous sodium chromate and an equal amount of alumina (hydrate) precipitated from sodium aluminate by carbon dioxide and which was known to contain 23 grams of aluminum (expressed as $Al_2O_3$). This represented an excess of aluminum of about 13% over the stoichiometric amount required to react with the sodium introduced as sodium chromate to form sodium aluminate. These materials were thoroughly mixed, using a mortar and pestle, and the mixed materials were then subjected to the following tests:

(a) A series of 10 tests was conducted wherein no fusion was met with in any of the tests as the reacting materials were kept away from the high temperature portion of the tube as described in Example I (b). The reaction products in every case were friable and easily removed from the boat.

(b) In this test hydrogen was used as the reducing gas and the reaction products were boiled for 30 minutes with a 10% caustic soda solution. The insoluble chromic oxide was recovered, washed and dried as before. The amount recovered in this test was 0.65 gram, equivalent to a 91% yield.

(c) In a further test with the same starting material mixture, but with carbon monoxide as the reducing agent, the amount recovered was 0.67 gram of chromic oxide, equivalent to a 94% yield.

(d) In a further test, a mixture of hydrogen and carbon dioxide (the latter an inert diluent gas) in approximately equal proportion, was used as the reducing agent, 0.63 gram of chromic oxide being recovered, which was equivalent to an 88% yield.

*Example III*

In this test, which was qualitative only, sodium bichromate was mixed with an excess of hydrate of alumina as hereinabove taught and charcoal in excess amount with respect to that stoichiometrically required was used as the reducing agent. Upon leaching the resulting reaction products, the solution was found to be substantially free of soluble chromate and the insoluble material separated from the leach solution was found to be a mixture of chromic oxide and the excess charcoal along with a small amount of the ash introduced with the charcoal. In another test the process was repeated as set forth in this example except that the starting material consisted of sodium chromate instead of sodium bichromate, the results being essentially the same.

*Example IV*

In this test, which was also qualitative only, sodium chromate was mixed with an excess of aluminum phosphate and reduced with hot hydrogen in the manner described in Examples I and II. No precautions were used in this particular test to prevent overheating of the materials during the reaction, so that the reaction products were found to be fused and, as such, relatively difficult to handle in removing them from the boat and in the subsequent leaching operation. No quantitative results were obtained.

Sodium bichromate was similarly tested in lieu of sodium chromate as set forth in this example and with similar results.

*Example V*

In a number of tests in this example, both chromate and bichromate were tested with less than the stoichiometric amount of alumina. In each case, the solution remaining after removal of the chromic oxide in the leaching of the reaction products was found to contain an appreciable amount of soluble chromium. This was assumed to be unreacted sodium chromate and/or bichromate. No yield figures were obtained from a quantitative point of view; but it was concluded that an excess of an aluminum compound, while not essential to the process, as the soluble chromium could be recovered and recycled, was nevertheless desirable from the point of view of a high yield of the desired chromic oxide and the economics of the process generally.

*Example VI*

This example illustrates the treatment of the leach solution for the recovery of aluminum compounds for reuse. In this test a portion of leach solution was treated for one hour at 190° F. with carbon dioxide gas which was bubbled therethrough, the treatment continuing until no further precipitation apparently occurred. There was obtained a voluminous precipitate, which, was, however, easily separated by filtration. This material was filtered, tested and found to be identical, as far as the test showed, with the product obtained when sodium aluminate solution (carefully prepared as such) was so treated. After washing and drying, the recovered material was successfully used in the treatment of sodium chromate in the principal reducing operation as described in the descriptive portion of this disclosure and in the preceding examples. The solution separated from the hydrated alumina product was found to contain sodium carbonate and some excess carbon dioxide.

In a further test, the leach solution above described was treated by acidifying with sodium bicarbonate, instead of carbon dioxide, with the same results as described above in this example.

A portion of leach solution from a reduction reaction, in which aluminum phosphate was used in lieu of hydrated aluminum, was treated exactly as described in this example, with the result that a different type of precipitate was obtained. This precipitate was separated from the solution by filtration; and after washing and drying, was tested and found to behave exactly the same as the aluminum phosphate used initially in the reduction reaction in producing chromic oxide from sodium chromate as herein described. The solution obtained as filtrate following the treatment of the leach solution from which the aluminum phosphate was obtained was the same as the test previously described.

A further portion of leach solution resulting from treating reaction products in which aluminum phosphates had been used was treated with sodium bicarbonate instead of carbon dioxide, other conditions being the same. The results were the same as when carbon dioxide was used.

While there have been described herein but a limited number of the possible alternatives, an attempt has been made to explain the critical character or absence thereof in each instance and to set out equivalents to the extent that they are known. Other equivalents and variations of the present process will occur to those skilled in the art from the foregoing disclosure. I do not wish to be limited, therefore, except by the appended claims, which are to be construed validly as broadly as the state of the prior art permits.

What is claimed is:

1. The process of preparing chromic oxide ($Cr_2O_3$) from a starting material selected from the group consisting of alkali chromates and bichromates, comprising the steps of mixing said starting material with an aluminum compound, which is at least one of the materials selected from the group consisting of $Al_2O_3$, $Al(OH)_3$ and $AlPO_4$, the amount of said aluminum compound being approximately stoichiometrically equivalent to the amount of alkali metal initially present in combination with said chromates and bichromates to form alkali aluminate; heating the materials so mixed in the presence of a reducing agent and to a temperature in the range of about 1000° F. to about 1200° F. so as to initiate an exothermic reaction therebetween; after the completion of said reaction, leaching the reaction products with an aqueous solution of caustic alkali in sufficient amount and concentration to dissolve all the aluminum compounds present and to leave chromic oxide undissolved; and separating the leach solution from said undissolved chromic oxide.

2. The process of preparing chromic oxide ($Cr_2O_3$) from a starting material selected from the group consisting of alkali chromates and bichromates, comprising the steps of mixing said starting material with an aluminum compound, which is at least one of the materials selected from the group consisting of $Al_2O_3$, $Al(OH)_3$ and $AlPO_4$, the amount of said aluminum compound being approximately stoichiometrically equivalent to the amount of alkali metal initially present in combination with said chromates and bichromates to form alkali aluminate; heating the materials so mixed in the presence of a reducing agent and to a temperature in the range of about 1000° F. to about 1200° F. so as to initiate an exothermic reaction therebetween; after the completion of said reaction, leaching the reaction products with an aqueous solution of caustic alkali in sufficient amount and concentration to dissolve all the aluminum compounds present and to leave chromic oxide undissolved; and separating the leach solution from said undissolved chromic oxide.

3. The process of preparing chromic oxide in accordance with claim 1, in which said reducing agent is introduced into contact with the chromates and bichromates and the aluminum compound in a gaseous state, so as to leave no water-insoluble contaminating materials with the undissolved chromic oxide following the leaching operation aforesaid.

4. The process of preparing chromic oxide in accordance with claim 1, in which said reducing agent is a gaseous material selected from the group which consists of hydrogen and carbon monoxide.

5. The process of preparing chromic oxide in accordance with claim 1, in which said reducing agent is a lower aliphatic alcohol which is introduced into contact with the chromates and bichromates and the aluminum compound in a gaseous state, and in which an oxidation product of said reducing agent is also a vaporizable organic compound which is gaseous at the reaction temperature and which is per se valuable, so that it may be separated from the other reaction products as a gas following the completion of the reaction and may thereafter be used as an additional product of the process.

6. The process of preparing chromic oxide in accordance with claim 1, in which said reducing agent is introduced into contact with the chromates and bichromates and the aluminum compound in a gaseous state, and comprising the additional step of controlling the rate of said exothermic reaction by diluting this reducing agent with an inert gaseous material.

7. The process of preparing chromic oxide ($Cr_2O_3$) from a starting material selected from the group consisting of alkali chromates and bichromates, comprising the steps of mixing said starting material with an aluminum compound, which is at least one of the materials selected from the group consisting of $Al_2O_3$, $Al(OH)_3$ and $AlPO_4$, the amount of said aluminum compound being approximately stoichiometrically equivalent to the amount of alkali metal initially present in combination with said chromates and bichromates to form alkali aluminate; heating the materials so mixed in the presence of a reducing agent and to a temperature in the range of about 1000° F. to about 1200° F. so as to initiate an exothermic reaction therebetween; following the completion of said reaction, leaching the reaction products with an aqueous solution of caustic alkali in sufficient amount and concentration to dissolve all the aluminum compounds present and to leave chromic oxide undissolved; separating the leach solution from said undissolved chromic oxide, and treating the separated leach solution with a weakly acidic material selected from the group which consists of alkali bicarbonates and carbon dioxide to precipitate the aluminum present therein in the form of a water-insoluble compound, which, after separation from the liquid in which the precipitate was formed, can be used as the aluminum compound to be mixed with the starting material as aforesaid for the repetition of the process.

8. The process of preparing chromic oxide in accordance with claim 7, in which, following the precipitation of the aluminum as aforesaid to yield a slurry made up of a precipitate of aluminum hydrates selected from the group consisting of $Al_2O_3$, $Al(OH)_3$ and mixtures thereof, and a liquid solution of alkali salts, selected from the group consisting of alkali carbonates and bicarbonates, the precipitate is separated from the supernatant liquid in which it was precipitated and this liquid is thereafter concentrated and the alkali salt content thereof recovered for reuse.

9. The process of preparing chromic oxide in accordance with claim 7, comprising the further steps of separating the precipitated aluminum compound from the supernatant solution, and thereafter recovering an alkali salt from this solution by concentration and evaporation, said alkali salt being in a form selected from the group consisting of alkali carbonates and bicarbonates.

10. The process of preparing chromic oxide in accordance with claim 1, in which said aluminum compound is an aluminum hydrate; and comprising the further steps of treating said leach solution with a carbonating agent selected from the group consisting of alkali bicarbonate and carbon dioxide in sufficient amounts and concentration so as to precipitate from the acidified leach solution substantially all the aluminum content thereof in the form of an aluminum hydrate; and reusing said aluminum hydrate so prepared as the aluminum compound for admixture with starting material in the repetition of the process.

11. The process of preparing chromic oxide in accordance with claim 1, in which said aluminum compound which is admixed with said starting material is aluminum phosphate; and comprising the further steps of treating the separated leach solution with a carbonating agent, selected from the group consisting of alkali bicarbonate and carbon dioxide, in sufficient concentration and amount so as to precipitate substantially all the aluminum content of said acidified leach solution as aluminum phosphate, separating the precipitated aluminum phosphate from the remaining solution, and reusing this aluminum phosphate as the aluminum compound for admixture with starting material in the repetition of the process.

References Cited in the file of this patent

UNITED STATES PATENTS

| | | |
|---|---|---|
| 1,158,379 | Gessler | Oct. 26, 1915 |
| 1,723,556 | Meyer et al. | Aug. 6, 1929 |
| 1,760,788 | Specketer et al. | May 27, 1930 |
| 2,316,330 | Hawk | Apr. 13, 1943 |
| 2,587,552 | Vendensky | Feb. 26, 1952 |

FOREIGN PATENTS

Mellor: Comprehensive Treatise on Inorganic and Theoretical Chemistry, Longmans, Green and Co., New York, 1923, vol. 5, pages 279, 280 and 286.